United States Patent [19]

Brody

[11] 3,855,004

[45] Dec. 17, 1974

[54] METHOD OF PRODUCING CURRENT WITH CERAMIC FERROELECTRIC DEVICE

[75] Inventor: Philip S. Brody, Brookmont, Md.

[73] Assignee: The United States of America as represented by the Secretary of the Army, Washington, D.C.

[22] Filed: Nov. 1, 1973

[21] Appl. No.: 411,853

[52] U.S. Cl. .................................................. 136/89
[51] Int. Cl. .................................................. H01l 15/02
[58] Field of Search ....... 136/89; 252/62.3 BT, 62.9

[56] References Cited

UNITED STATES PATENTS

| | | | |
|---|---|---|---|
| 2,691,738 | 10/1954 | Matthias | 136/89 UX |
| 2,989,482 | 6/1961 | Miller | 252/62.3 BT X |
| 3,032,706 | 5/1962 | Wieder | 252/62.9 X |
| 3,666,666 | 5/1972 | Haertling | 252/62.9 |
| 3,721,628 | 3/1973 | Lock et al. | 252/62.9 |

*Primary Examiner*—Allen B. Curtis
*Attorney, Agent, or Firm*—Saul Elbaum

[57] ABSTRACT

The device consists of a wafer of polycrystalline perovskite oxide ceramic such as barium titanate, lead titanate - lead zirconate, or lead titanate-lead zirconate with 7.5% or less of the lead substituted for by lanthanum. Electrical terminals are joined to the wafer edges. When the ceramic is exposed to visible radiation such as sunlight a high voltage appears across the terminals and an electrical current flows through a load resistance connected between said terminals. The voltage across the load resistance depends upon the length of the wafer between the two terminals and the magnitude of the load resistance. Voltages of at least 500 volts per inch are produced for high values of load resistance. When the load resistance is high the magnitude of the voltage is independent of the intensity of the light over a large range. When the load resistance is low the current is directly proportional to the intensity of the light over many orders of magnitude. In preparing the ceramic as a ferroelectric cement it is subjected to poling whereby high voltage is placed across the electrode of the element for a short period of time.

2 Claims, 8 Drawing Figures

PATENTED DEC 1 7 1974

3,855,004

SHEET 1 OF 3

METHOD OF PRODUCING CURRENT WITH CERAMIC FERROELECTRIC DEVICE

RIGHTS OF THE GOVERNMENT

The invention described herein may be manufactured, used and licensed by or for the U.S. Government for governmental purposes without the payment to the inventor of any royalty thereon.

BACKGROUND OF THE INVENTION

1. Field of the Invention

This invention is related to that class of solid state devices known as photoelectric generators or transducers, more specifically, the device is of the class of polycrystalline ferroelectric ceramic which exhibit high voltage electricity when exposed to electromagnetic radiation.

2. Description of the Prior Art

Heretofore, single crystals of barium titanate have indicated a photovoltage of a fraction of a volt. Lower than band gap photovoltages have been observed in the ceramic, barium titante. However, photovoltages of the magnitude produced by the device of the invention have not previously been discovered.

The device of the invention produces photovoltages much higher than the material band gap. This was first discovered in barium titanate ceramic. However, the effect has been observed in several other ceramics which all seem to be of the general class of ferroelectric perovskite oxides. I have discussed that a ceramic material having the following properties is necessary for the device of the invention:

1. The ceramic must consist of an aggregate of small crystals.

2. The crystals making up the ceramic must be ferroelectric in the temperature range in which the device is to operate.

3. The direction of the electric moments of spontaneously polarized regions of the aggregate must be capable of being reversed.

The process of manufacture for perovskite oxide ceramic such as barium titanate, lead titanate-lead zirconate, and the lead titanate-lead zirconate with 75 percent or less of the lead replaced by lanthanum is described in various patents and publications. An early reference to a method for forming a perovskite oxide ceramic which exhibits ferroelectric properties at room temperature and which may be poled is U.S. Pat. No. 2,492,588 to Thurnauer et al. An early reference describing a poling process for the perovskite ceramic is U.S. Pat. No. 2,486,560 to Gray.

Photovoltaic diodes made of silicon or other semiconducting single crystal material have been in existence for some time. The photovoltages produced by these photodiodes are characteristically low. A silicon diode produces a maximum of about 1 volt irrespective of its size. Photodiodes made of other semiconductive materials produce similar voltages. Production of higher voltages can only be directly accomplished by connecting many such photodiodes in series. A silicon photocell used for solar energy conversion produces at most 1 volt for an effective area of one square inch. In addition, a characteristic high voltage photoelectric current has been observed in single crystals of zinc sulphide and in thin films of evaporated semiconductors having the evaporating source at an angle to the substrate. Neither of these materials is a ferroelectric ceramic and no poling processes are required to produce a photovoltaically active material. In both of these materials the voltage magnitude of the effect is erratic. Therefore, it is not used as the basis of a device.

It is therefore an object of this invention to provide a new kind of photoelectric polycrystalline ceramic material for producing high voltage electricity.

It is another object of this invention to provide a new photoelectric device capable of producing extremely high voltage when subjected to visible radiation such as sunlight.

It is yet another object of this invention to provide a new photoelectric cell capable of producing voltages as high as 500 volts per linear inch of cell material.

It is still another object of this invention to provide a polycrystalline ceramic photoelectric cell which provides a current directly proportional to the intensity of the illumination over many orders of magnitude.

These and other objects of the present invention will become more fully apparent with reference to the following specifications and drawings which relate to several preferred embodiments of the present invention.

SUMMARY OF THE INVENTION

In accordance with the disclosure herein presented the invention is a ferroelectric ceramic photoelectric device capable of producing high voltages of at least 500 volts per linear inch of active material. The device is produced by first subjecting ferroelectric ceramic to a poling process whereby a high voltage is applied across electrodes attached to the edge of a wafer of the ceramic for a specific period of time. The amount of voltage produced by a particular specimen of the ceramic is controlled by the amount of voltage that is applied during the poling process and the length of time that it is applied. The ceramic utilized for producing this high voltage photoeletric device is selected from the group consisting of barium titanate and lead zirconate, and a solid solution of lead titanate and lead zirconate doped with lanthanum. The device functions at high voltage because it is polycrystalline. A condition for operation is that the crystals therein be ferroelectric in the operating temperature range. Constant high voltage output of the device is obtained independent of illumination intensity. This is accomplished by connection of a high resistance element across the electrodes of the device. The photocurrent may also be made to vary linearly with the magnitude of the intensity of illumination. This is obtained by connecting a low resistance element across the electrodes of the device.

BRIEF DESCRIPTION OF THE DRAWING

The specific nature of the invention as well as other objects, aspects, uses, and advantages thereof will clearly appear from the following description and from the accompanying drawing, in which.

DESCRIPTION OF THE PREFERRED EMBODIMENT

Satisfactory ceramic material for the photoelectric device may be either barium titanate with a 5% by weight addition of calcium titanate ($BaTiO_3$ + 5 wt.% $CaTiO_3$), or a solid solution of lead titanate and lead zirconate consisting of 65 mole percent lead zirconate and 35 mole percent lead titanate. Typically grain size for the ceramic photoelectric device is a diameter of 10 to 100 microns.

Figure 1A:
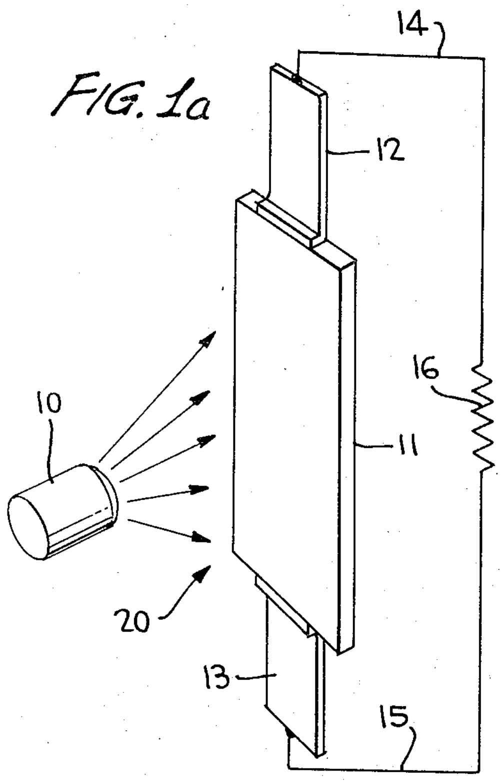
FIG. 1*a* is an illustration of the device showing the pertinent elements necessary for its operation.
Figure 1B:
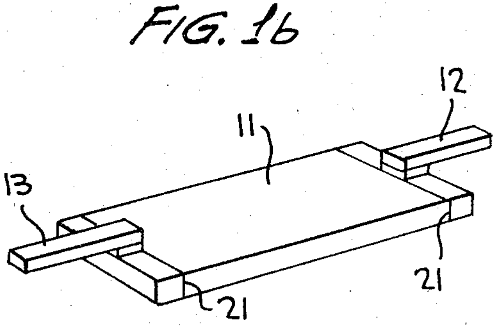
FIG. 1*b* is an illustration of an element with permanent electrodes attached.
Figure 1C:
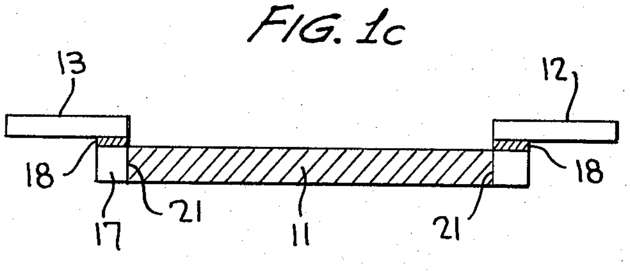
FIG. 1*c* is a cross-section of the illustration of FIG. 1*b*.

In FIG. 1*a* is shown a pictoral sketch of the device 20 connected in series with a load resistor 16. Specifically, light source 10 illuminates the photoelectric ceramic 11 shown generally at 20 with electrodes 12 and 13 attached thereto. Leads 14 and 15 of the resistor 16 are connected respectively to electrodes 12 and 13 of the photoelectric device 20. In FIG. 1(b) is shown a perspective of a ferroelectric ceramic 11 with the leads 12 and 13 attached to the edges. In FIG. 1*c* the high voltage photoelectric ceramic element 11 is shown with a chromium base 21 flashed onto the edge of the ceramic 11; and, onto the chromium base 21 gold electrodes 17 are deposited. On top of gold electrodes 17 gold wires or leads 12 and 13 are epoxy bonded by means of conducting epoxy resin 18 onto the gold electrodes 17.

Figure 2:
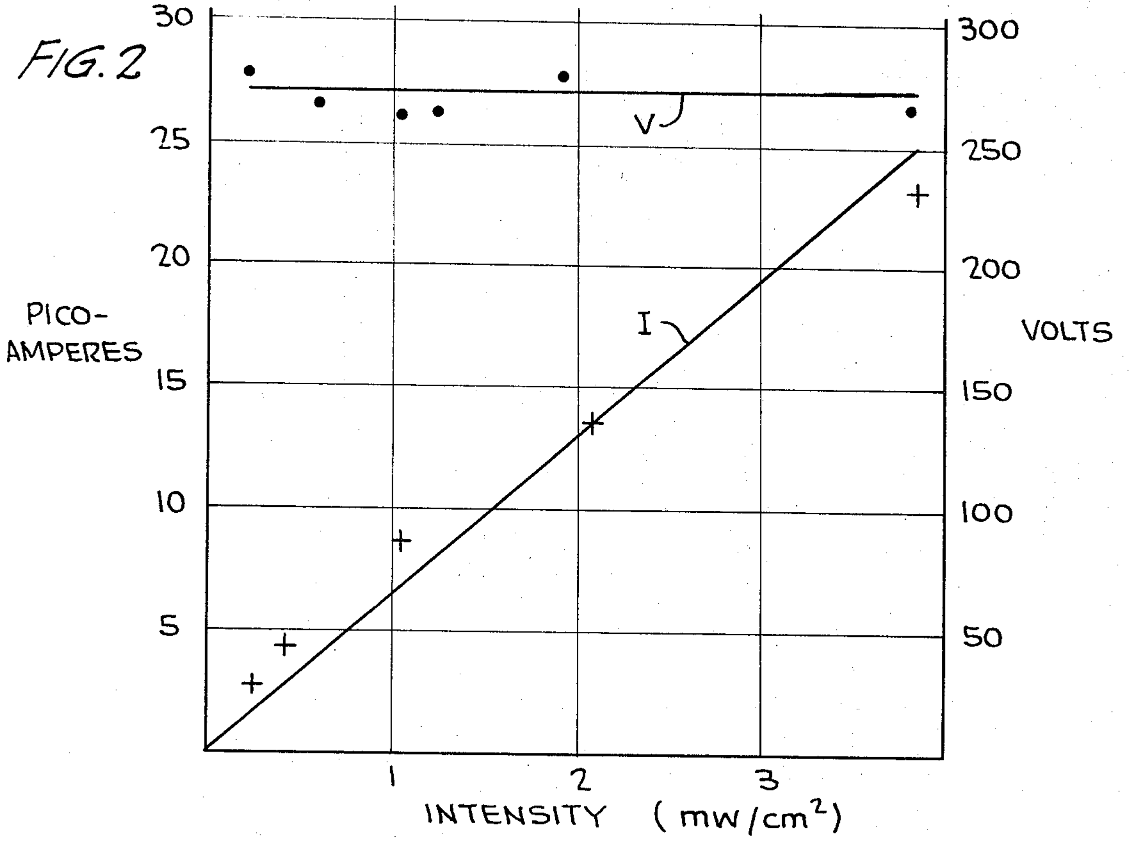
FIG. 2 is a graph of output voltage and output current versus intensity for a device of the invention.

The results which I obtained from a high voltage photoelectric device device comprising a wafer sample of barium titanate with 5% weight calcium titanate measuring 0.025 centimeters thickness, 0.638 centimeters width, and 1.27 centimeters long, are given as follows:

1. The photovoltage (versus intensity) of the sample wafer is illustrated in FIG. 2 as plot V wherein a high resistance impedence greater than $10^{16}$ ohms was connected across the ceramic wafer.

2. The photocurrent (versus intensity) is as indicated by FIG. 2, plot I, wherein a high resistance of $10^{8}$ ohms was connected across the wafer element. The resistance for the photocurrent determination was effectively a short circuit.

The sample described above behaved as a very high impedance source.

I used illumination from a high-pressure mercury arc lamp. A zirconium arc lamp may also be used to provide these same results.

The wafers were poled by applying an electric field of approximately 25 kilovolts per centimeter for approximately one half hour. This poling produces a maximum remanent polarization of 10 $\mu C/cm^2$ in the direction perpendicular to the electrodes.

It is worthwhile to note that experimentation with the ferroelectric ceramic herein has shown that photovoltage and photocurrent measurements are not pyroelectric outputs produced by temperature changes. The photovoltage and photocurrent measurements were made at thermal equilibrium. As can be seen from FIG. 2, for the ranges of intensity indicated, the photocurrent was proportional to the intensity of the source and the photovoltage independent of it. A wafer which is not illuminated shows no voltage and the photovoltage produced by illumination eventually vanishes when the illumination is removed. Photovoltages produced by wafers measuring 0.0.3 × 0.107 × 1.27 centimeters show a linear dependence on length.

Figure 3:
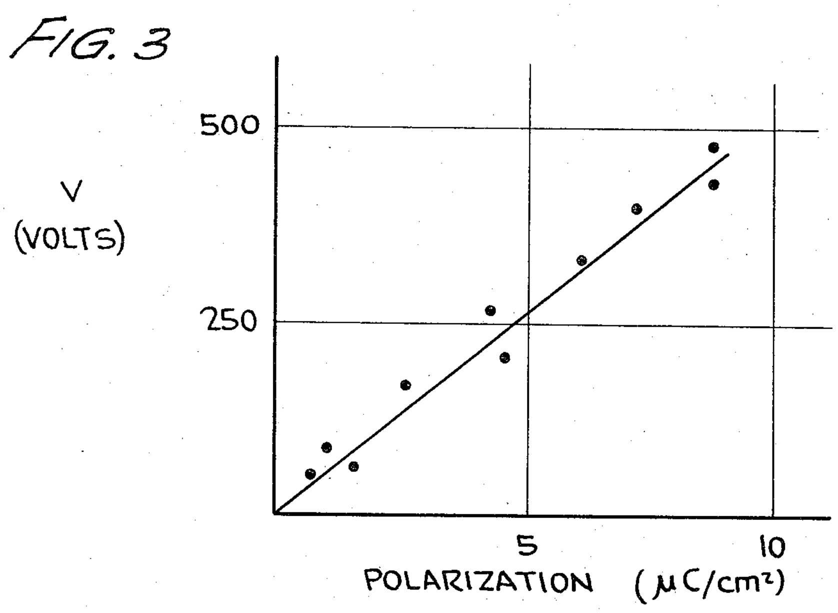
FIG. 3 is a graph of output voltage versus polarization for material of the invention.

In the ferroelectric devices comprising multidomained ferroelectric material a linear dependence of photovoltage on the remanent polarization is exhibited. The remanent polarization may be varied by applying different poling voltages at room temperatures. Reversing the polarization of a wafer reverses the polarity of the photovoltage. In the case of barium titanate doped with 5 percent by weight calcium titanate the length—proportional, polarization—proportional photovoltage is approximately 40(volts/cm)/($\mu C/cm^2$). FIG. 3 illustrates the linear dependence of photovoltage on the remanent polarization for barium titanate doped with 5 percent calcium titanate by weight.

Photovoltage is also dependent upon temperature. This temperature dependence of photovoltage for the 1.27 centimeter sample described above is illustrated by the photovoltage versus temperature curve V in FIG. 4. Also shown is a spontaneous polarization versus temperature curve 90 for the wafer.

Figure 5:
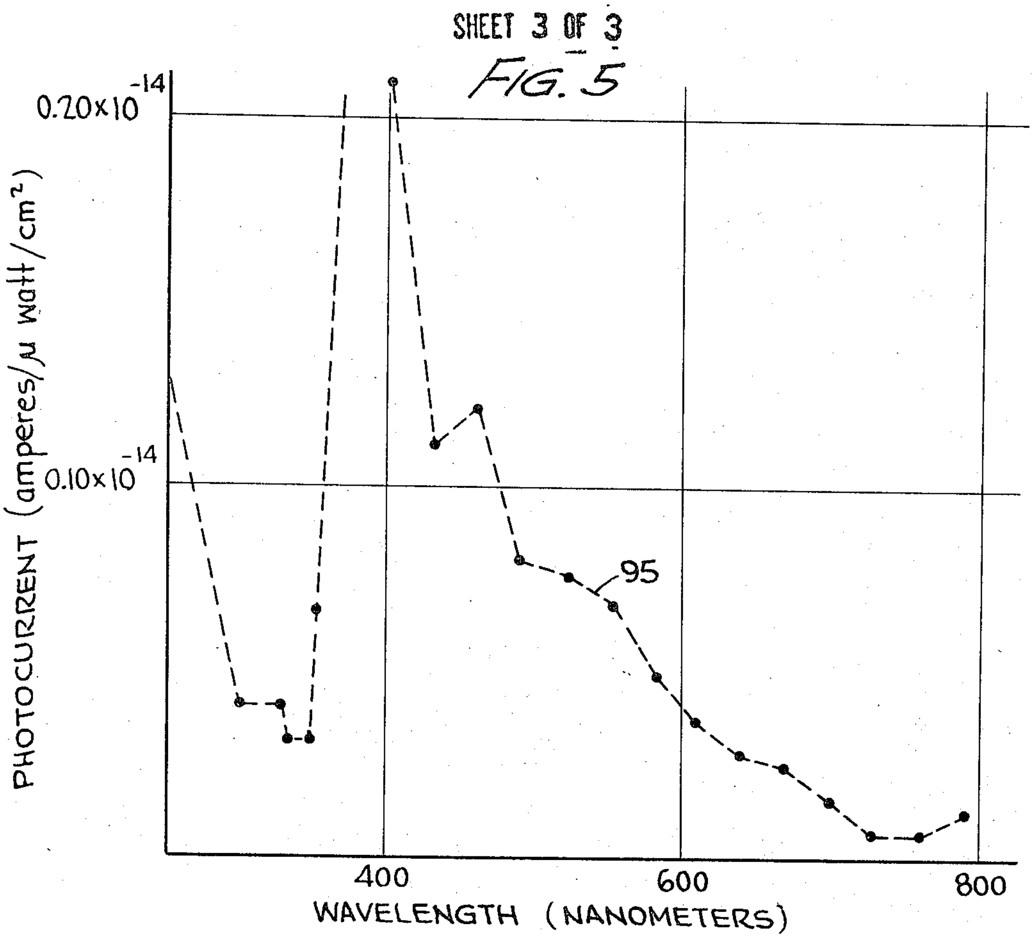
FIG. 5 is a graph of photocurrent versus illumination wavelength.
Figure 6:
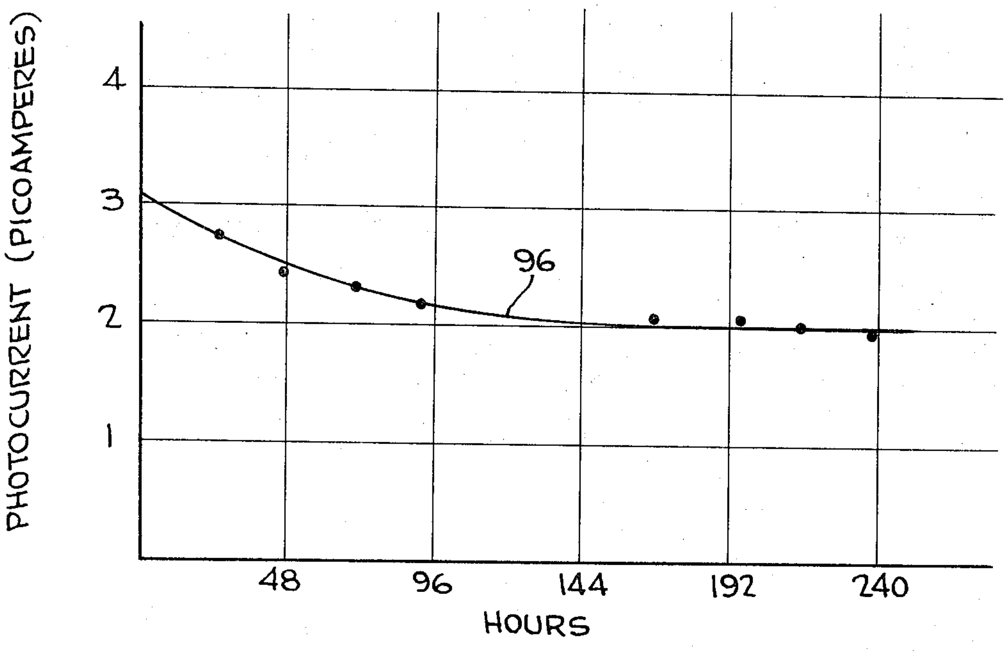
FIG. 6 is a graph of photocurrent output versus duration of operation.

The plot 95 of photocurrent versus wavelength of the illumination is illustrated in FIG. 5. In order to obtain this plot mercury and zirconium sources having quartz optics and narrow bandwidth interference filters were used. The output current of the above described samples peaks in the 400 nanometer band gap radiation region. This peak is reduced for greater energies when all the light is absorbed at the surface of the wafer. FIG. 6 is a plot 96 of photocurrent versus time over an extended period of time of approximately 240 hours. There is some decay during the first 72 hours of operation. However, the approximately constant current level was reached at the approach of the 240 hour monitoring period. This initial decay is due to an initial decrease with time of the remanent polarization of the sample.

Figure 4:
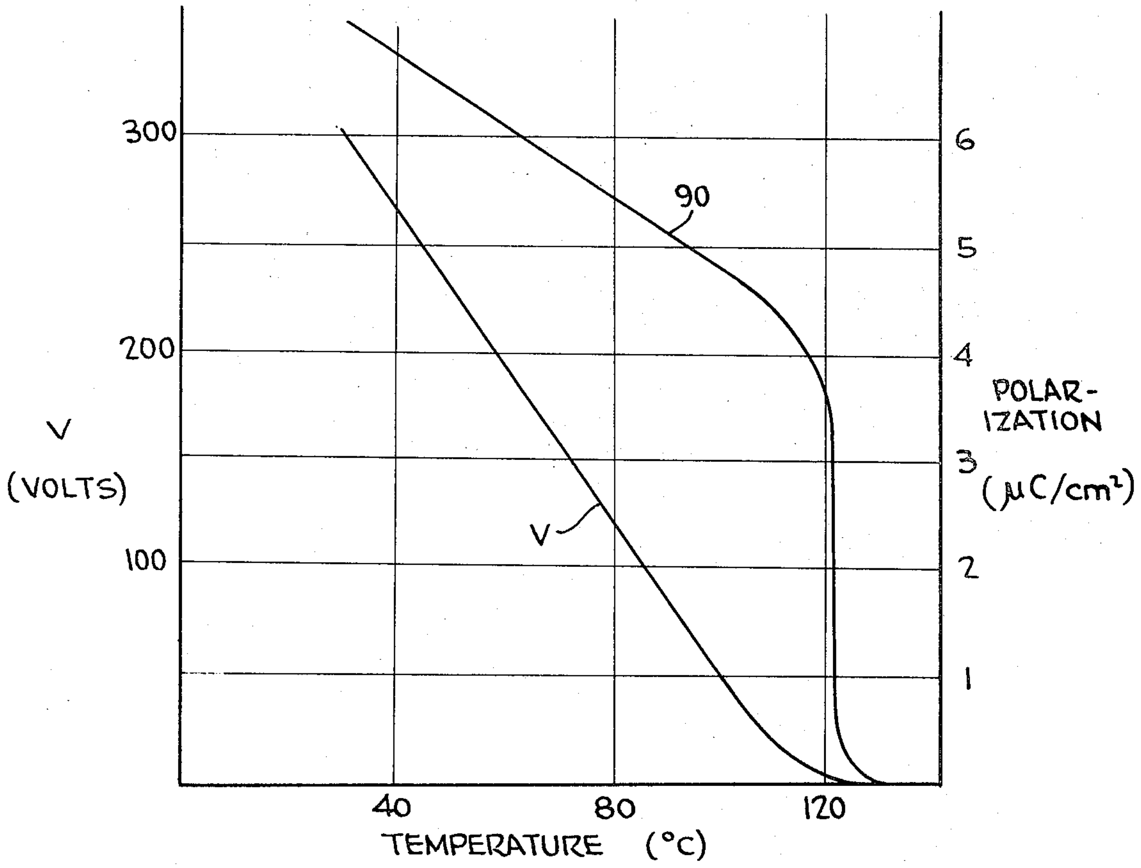
FIG. 4 is a graph of voltage output and polarization versus temperature.

The dependence of the photovoltage in the ceramic samples on remanent polarization is apparently the result of the alignment of crystallite photovoltages in the aggregate structure. The high voltage therefore appears as a result of photo-induced fields parallel to the c-axis. These fields are related to the crystal polarity. FIG. 4 indicates that the fields in the individual crystallites which contributes to the large photovoltages vanish at the Curie temperature. At this temperature the crystallites are in a cubic central symmetric state.

Grain sizes in the ceramic wafer sample range from 10 to 100 microns across. Approximate grain photovoltage is 1 volt.

Photovoltages and photocurrents larger than that given above for barium titanate are available from ceramic consisting of a solid solution of lead titanate and lead zirconate, wherein 65 mole percent is lead zirconate and 35 mole percent is lead titanate. In addition, similar results may be obtained with the above said ceramic doped with lanthanum. This particular material is used in the form of a hot pressed ceramic consisting of a solid solution of lead zirconate and lead titanate doped with lanthanum. Proportions are 65 mole per cent lead zirconate and 35 mole per cent titanate with 8.5 per cent substitution of lead by lanthanum. An important characteristic of the lanthanum doped ceramic is that it is transparent.

There are many applications for this new and novel device. Among these is the application of the high voltage photoelectric ceramic device for energy conversion. This version of the device produces electrical energy from solar radiation much in the same manner as crystalline silicon. However, the electrical energy is produced by the present invention at a significantly higher voltage.

The device herein is also applicable for the production of high voltage in low current situations where energy conversion efficiency is not important. A device comprising 25 1 meter rods of the above described transparent lanthanum doped lead-titanate lead-zirconate ceramic connected in series and illuminated by 1 watt per square centimeter of 388 nanometer radiation produces enough electricity to charge a 100 picofarad capacitor to 1 megavolt in about one minute. Such a circuit has a RC rise time of about 12 seconds. For 1 milliwatt per square centimeter of radiation input, the charge time is 1,000 minutes or approximately 16.6 hours.

Another application of the device described herein is a sensitive radiation detector producing current output which varies linearly with intensity over many orders of magnitude of intensity. With this device no external voltage supply is required.

Still another application of the device herein is an optically activated memory unit. In this application an electrical pulse poles and conditions the memory unit to produce either a positive or negative electrical output pulse when illustrated. Selectivity may be obtained with the use of a laser beam. The polarity of the output voltage depends upon the polarity of the input pulse or poling. Such a device operates such that the magnitude of the output pulse is dependent on the magnitude of the input pulse.

It is to be understood that the inventor does not desire to be limited to the exact details of construction shown and described for obvious modifications will occur to a person skilled in the art pertaining hereto.

I claim:

1. A method for producing current in direct proportion to intensity of light comprising
   applying an electric voltage of predetermined magnitude to a polycrystalline ferroelectric ceramic for a predetermined time to pole the polycrystalline ferroelectric ceramic,
   removing the applied voltage,
   disposing two electrodes in conductive contact with the polycrystalline ferroelectric ceramic,
   attaching an electrical lead to each electrode,
   connecting a low resistance between the two leads,
   impinging light having a certain intensity upon the polycrystalline ferroelectric ceramic, and
   producing current through the resistance which is in direct proportion to the intensity of the light impinged upon the polycrystalline ferroelectric ceramic.
2. A method for producing a constant high voltage by impinging light of varying intensities upon a polycrystalline ferroelectric ceramic comprising
   applying an electric voltage of predetermined magnitude to a polycrystalline ferroelectric ceramic for a predetermined time to pole the polycrystalline ferroelectric ceramic,
   removing the applied voltage,
   disposing two electrodes in conductive contact with the polycrystalline ferroelectric ceramic,
   attaching an electrical lead to each electrode,
   connecting a high resistance between the two leads,
   impinging light of varying intensities upon the polycrystalline ferroelectric ceramic,
   producing a constant high voltage across the resistance irrespective of the varying intensities of the light impinged upon the polycrystalline ferroelectric ceramic.

* * * * *